United States Patent
Bass

[19]

[11] Patent Number: 5,962,779
[45] Date of Patent: Oct. 5, 1999

[54] METHOD FOR DETERMINING TIRE INFLATION STATUS

[75] Inventor: Ronald Marshall Bass, Houston, Tex.

[73] Assignee: Shell Oil Company, Houston, Tex.

[21] Appl. No.: 09/049,969

[22] Filed: Mar. 27, 1998

Related U.S. Application Data

[63] Continuation-in-part of application No. 08/790,634, Jan. 29, 1997, Pat. No. 5,753,810.

[51] Int. Cl.$^6$ .................................................. B60C 23/02
[52] U.S. Cl. ........................................ 73/146.5; 73/146.2
[58] Field of Search ............................... 73/146.3, 146.2, 73/146, 146.4, 146.5

[56] References Cited

U.S. PATENT DOCUMENTS

| | | | |
|---|---|---|---|
| 2,126,327 | 8/1938 | Hendel et al. | 73/31 |
| 2,313,156 | 3/1943 | Kratt, Jr. | 73/51 |
| 2,663,009 | 12/1953 | Finan | 340/58 |
| 3,715,720 | 2/1973 | Jehle | 340/58 |
| 3,878,712 | 4/1975 | Chapin | 73/31 |
| 3,973,436 | 8/1976 | Lendermann | 73/146.2 |
| 5,289,718 | 3/1994 | Mouseau | 73/146 |
| 5,396,817 | 3/1995 | Rosenweig | 73/146.2 |
| 5,445,020 | 8/1995 | Rosenweig | 73/146.2 |
| 5,585,604 | 12/1996 | Holm | |
| 5,753,810 | 5/1998 | Bass | 73/146.3 |

FOREIGN PATENT DOCUMENTS

| | | |
|---|---|---|
| 0 695 935 A1 | 3/1998 | European Pat. Off. . |
| 7900587 | 3/1998 | Netherlands . |

OTHER PUBLICATIONS

"A Path of Least Resistance", by Dennis Simanaitis, Road & Track, Jun., 1995.

International Search Report mailed Dec. 6, 1998.

*Primary Examiner*—Max Noori

[57] ABSTRACT

The inflation status of a vehicle tire is determined while the tire is installed on the vehicle by recording a first signal representing the weight (Y) on a scale plate with respect to time when the tire is rolling on the scale plate; recording a second signal representing the weight (X) on a deformation bar with respect to time when the tire is rolling over the deformation bar; determining the maximum Y of the first signal and the maximum X of the second signal; calculating a ratio R by dividing the maximum X of the second signal by the maximum Y of the first signal; and comparing the calculated ratio R (=X/Y) with a predetermined value for the ratio R pertaining to the maximum Y of the first signal and giving an underinflation signal if the calculated ratio is below the predetermined value. Predetermined values for the ratios are obtained by determining, for a large number of combinations of vehicles and tires, the ratio R as a function of tire pressure; calculating a threshold for each combination of vehicles and tires; and fitting a curve of predetermined values for the ratios R through points having as coordinates the corresponding maximum value Y of the weight on the scale plate with respect to time when the tire is rolling on the scale plate and the corresponding ratio pertaining to the threshold. The curve of predetermined values is fitted so as to define a smooth curve that is an envelope which lies below all threshold data but is as close to the data as possible.

4 Claims, 12 Drawing Sheets

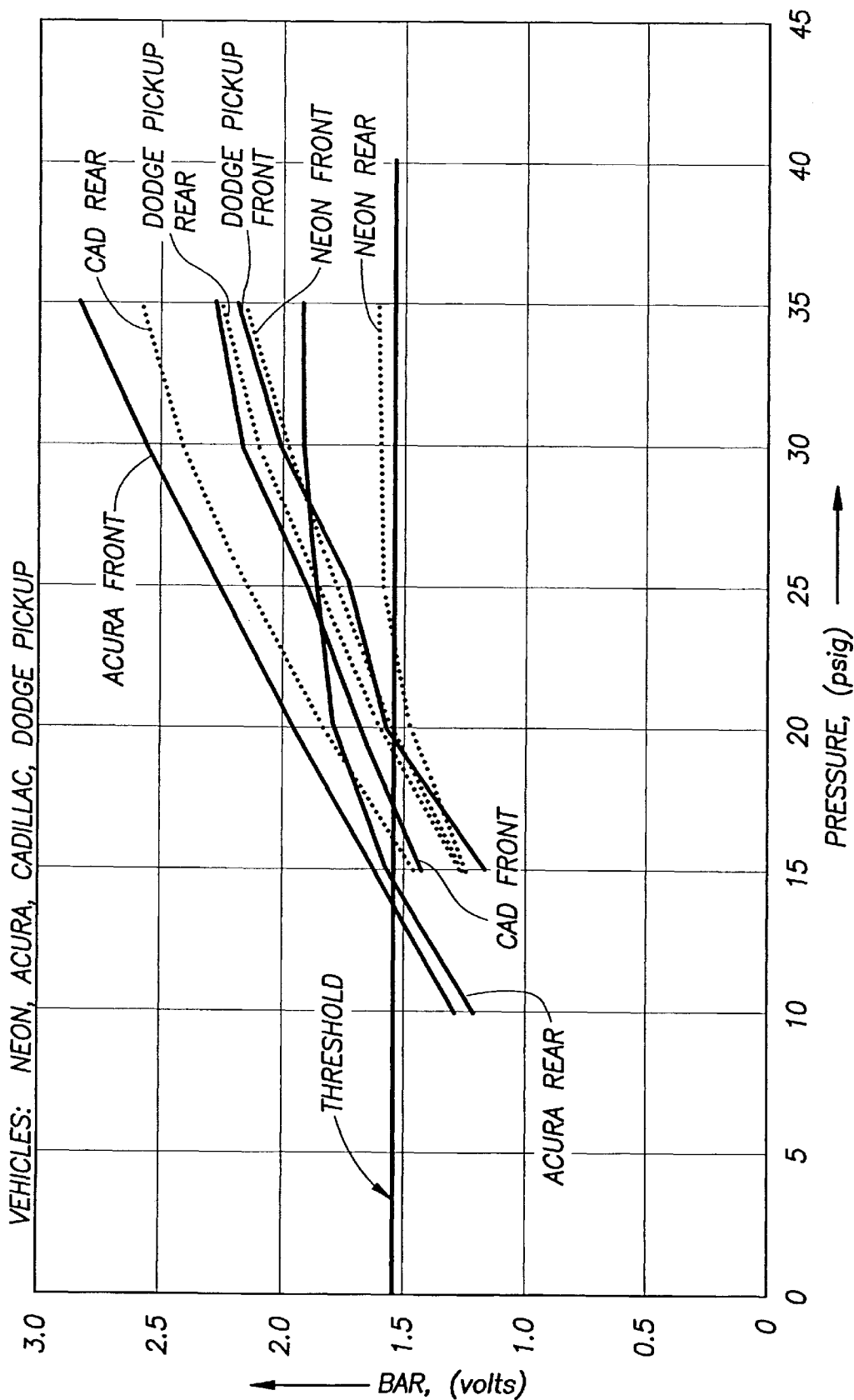

METHOD FOR DETERMINING TIRE INFLATION STATUS

RELATED APPLICATIONS

This is a Continuation-in-Part of Ser. No. 08/790,634 filed Jan. 29, 1997 now U.S. Pat. No. 5,753,810.

BACKGROUND

The invention is related to a method and apparatus for determining the inflation status of a vehicle pneumatic tire as the tire rolls over the apparatus and while the tire is attached to the vehicle. Access to the tire valve stem is not required.

1. Field of the Invention

U.S. Pat. Nos. 5,445,020 and 5,396,817 issued to Rosensweig disclose tire inflation sensors for making a series of point measurements and determining the pressure of a pneumatic tire mounted on a vehicle. The sensors are load cells mounted flush with the roadbed, i.e., there is no bar and thus no deformation of the tire other than that naturally occurring due to the load carried by the tire. Tire pressure distribution on the road surface is used, not total weight.

U.S. Pat. No. 2,126,327 to Hendel et al. does not use car weight in its analysis and does not use a bar. It makes some measurement of tire "force" distributed between a bladder and the surrounding road surface, but the bladder is not elevated above the roadbed. Rather, it is recessed, so tire deformation is not used in the process and total tire weight is not used.

U.S. Pat. No. 2,663,009 to Finan discloses a system for making an on-vehicle measurement of tire softness, not a road surface measurement. Something like a bar is used, but it does not measure total weight. This system can be calibrated for the specific tire on the specific vehicle whereas Applicant's invention will accommodate a wide variety of tires and vehicles.

U.S. Pat. No. 2,313,156 to Kratt, Jr., measures the force profile across the tire, the same approach used in the Rosensweig patents. Tire deformation is not used and total tire weight is not used.

U.S. Pat. No. 3,715,720 to Jehle involves depressing a probe (point measurement as opposed to across the whole tire) which is maintained at a specified force. Total weight is not used.

In U.S. Pat. No. 3,973,436 to Linderman, force distribution across the tire is measured, similar to U.S. Pat. No. 2,313,156. Neither a bar nor total weight is used.

U.S. Pat. No. 5,289,718 to Mousseau discloses a method for measuring the force exerted by the tire in going over a step. It does not use a bar or total weight, and is not intended for underinflation measurement but for measurement of tire force on rough surfaces. No means is described for extracting inflation-related information.

2. Description of the Invention

It is an object of the invention to provide an improved tire checker.

To this end, the apparatus for determining the inflation status of a vehicle tire according to the invention comprises a scale plate installed in a road surface, said scale plate being supported by at least one load cell; recording means connected to said at least one load cell for recording the weight Y on said scale plate with respect to time; a deformation bar located in said road surface and supported by at least one load cell, said deformation bar being raised above said road surface and adapted to deform said tire when said tire rolls over said deformation bar; and a recording means connected to said at least one load cell for recording the weight X on said deformation bar with respect to time.

It is also an object of the invention to provide a method of determining the inflation status of a vehicle tire.

To this end, such a method according to the invention comprises recording a first signal representing the weight on said tire with respect to time when the tire is rolling on a flat surface; recording a second signal representing the weight on said tire with respect to time when the tire is rolling over a raised object; determining the maximum Y of the first signal and the maximum X of the second signal; calculating a ratio R by dividing the maximum X of the second signal by the maximum Y of the first signal; and comparing the calculated ratio R ($=X/Y$) with a predetermined value for the ratio R pertaining to the maximum Y of the first signal and giving an underinflation signal if the calculated ratio is below the predetermined value.

BRIEF DESCRIPTION OF THE INVENTION

FIG. 6 is a graph, analogous to FIG. 4, of the bar reading vs tire pressure, for the data used in obtaining FIG. 4, showing a simple single-valued threshold independent of weight.

DETAILED DESCRIPTION OF THE PREFERRED EMBODIMENTS

The following description is made with reference to only one side of a vehicle. It will be appreciated that the preferred and most efficient embodiment of the invention will include two identical systems per FIG. 1A in order that the status of all four tires can be determined in a single pass.

Figure 1A:
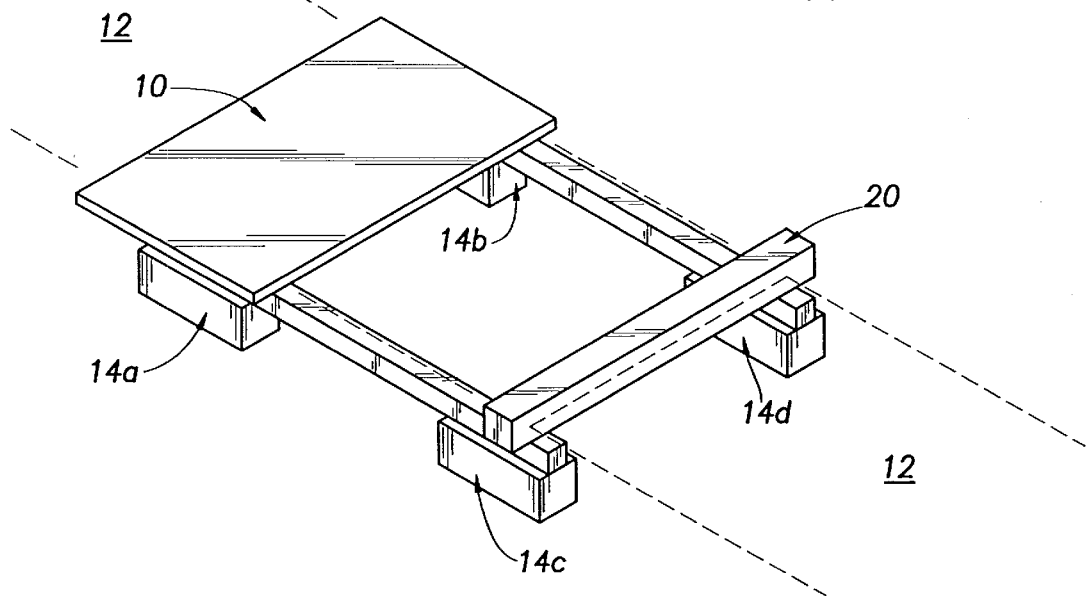
FIG. 1A is a schematic view of the mechanical components of the invention.
Figure 1B:
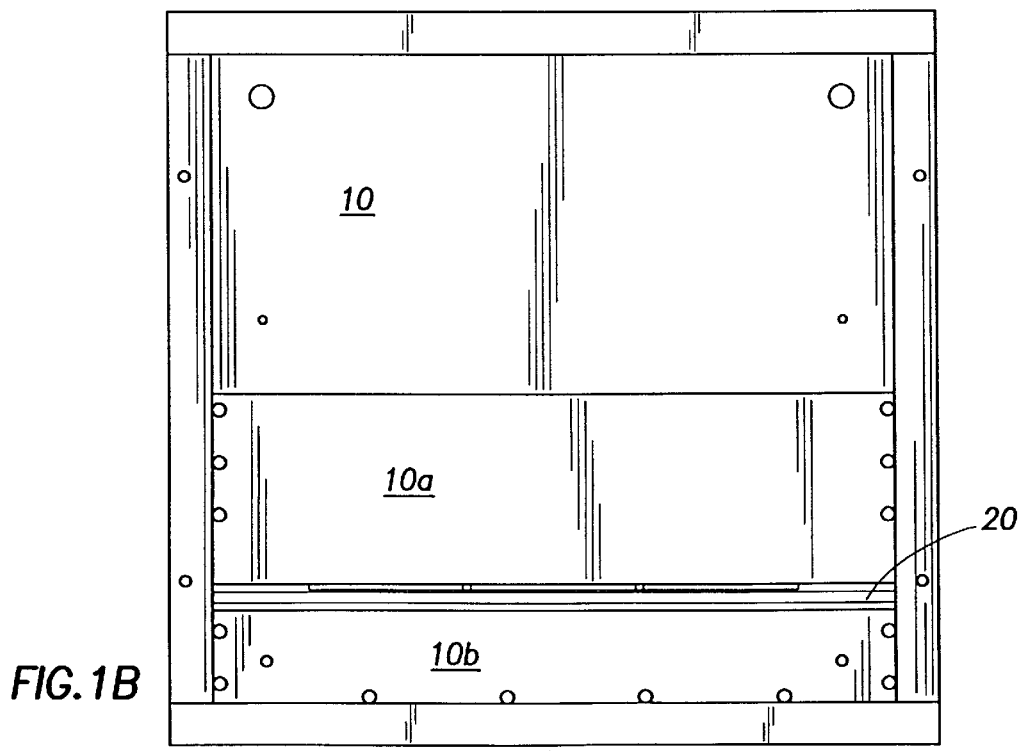
FIG. 1B is a plan view of the components of FIG. 1A.
Figure 1E:
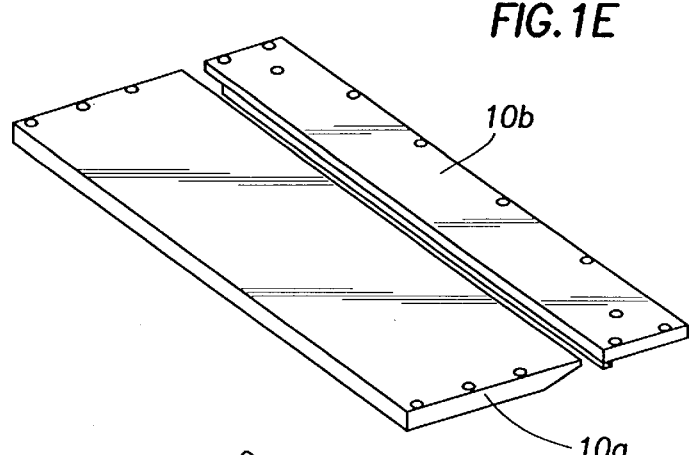
FIGS. 1C–1E are three-dimensional views of the frame assembly, the weight assembly, and the cover plate assembly, respectively, for the system of FIG. 1A.

Referring to FIG. 1A, a scale plate 10 is placed on a road surface 12. The road surface 12 is preferably the apron of an automobile service station, car wash, etc., with the scale plate 10 being situated such that an automobile can be driven over it when the driver desires some service such as fuel or a car wash. The scale plate 10 is flush with the road surface 12 and is supported by load cells 14a, 14b, 14c and 14d which, when deflected by the weight of the vehicle as the tire rolls over it, produce output voltages from their strain gauges. These output voltages from the strain gauges are transmitted to a load cell summer 40 (see FIG. 3), which adds together the voltages from the four load cells. The maximum reading of the load cell summer 40 output from the scale is used for computations and is denoted as "Y." FIG. 1B shows a plan view of the scale of FIG. 1A with covers in place, including center plate 10a and exit cover 10b, and deformation bar 20. Center plate 10a and exit cover 10b are not supported by load cells. They are part of the frame assembly and, therefore an extension of the road surface 12. As described herein, the expression "road surface" is meant to include the center plate 10a and exit cover 10b.

Situated proximate to, and preferably in the same tire-travel path with, scale plate 10 is a deformation bar 20 also supported by load cells, preferably the same load cells 14a, 14b, 14c and 14d used for the scale plate 10 measurements. As the tire rolls over the deformation bar 20 (see FIGS. 2A and 2B), voltages are produced by the load cell strain gauges. These voltages are transmitted to the load cell summer 40 and undergo the same type of transformation as did the signals from the scale plate 10. The maximum reading of the load cell summer 40 from the deformation bar 20 is used for computation and is denoted as "X." The analog outputs from the load cell summer 40 are input to the computer 60 via an analog-to-digital (A/D) converter 45. The maximum values X and Y are determined by the computer 60.

Figure 2A:
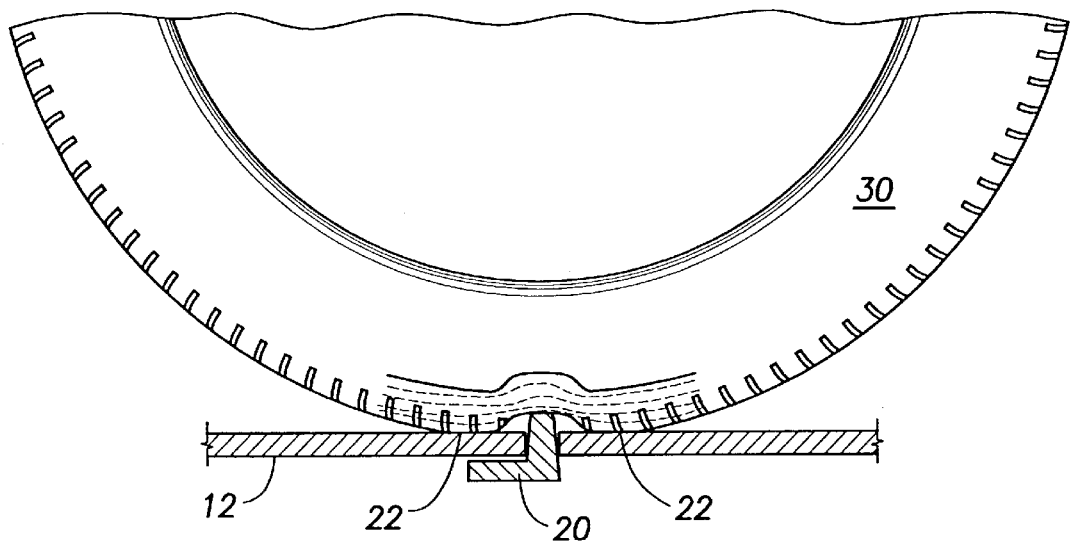
FIG. 2A is a conceptual view of the tire deformation of an underinflated tire as it rolls across a raised bar.
Figure 2B:
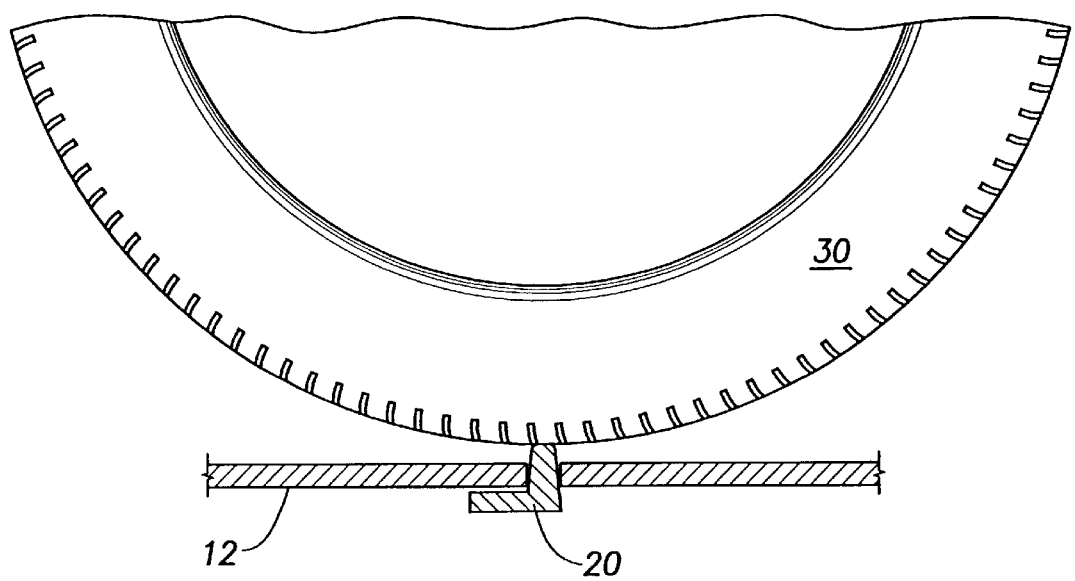
FIG. 2B is a conceptual view of the tire deformation of a properly inflated tire as it rolls across a raised bar.

The deformation bar 20 protrudes slightly above the road surface 12 such that, as shown in FIG. 2A, an underinflated tire deforms to such an extent that the tread of the tire 30 touches the road surface 12 on either side of the deformation bar 20 such as at the touch points 22. Thus, some of the load on the tire 30 is supported by the road surface 12 at touch points 22 and some of the load is supported by the deformation bar 20. The deformation of a properly inflated tire 30 is shown in FIG. 2B which shows the tire 30 completely supported by the deformation bar 20 with no portion of the tire 30 touching, and being supported by, the road surface 12. In actual practice, a properly inflated tire carrying a heavy load may, in fact, touch the road surface as discussed below.

Figure 9:
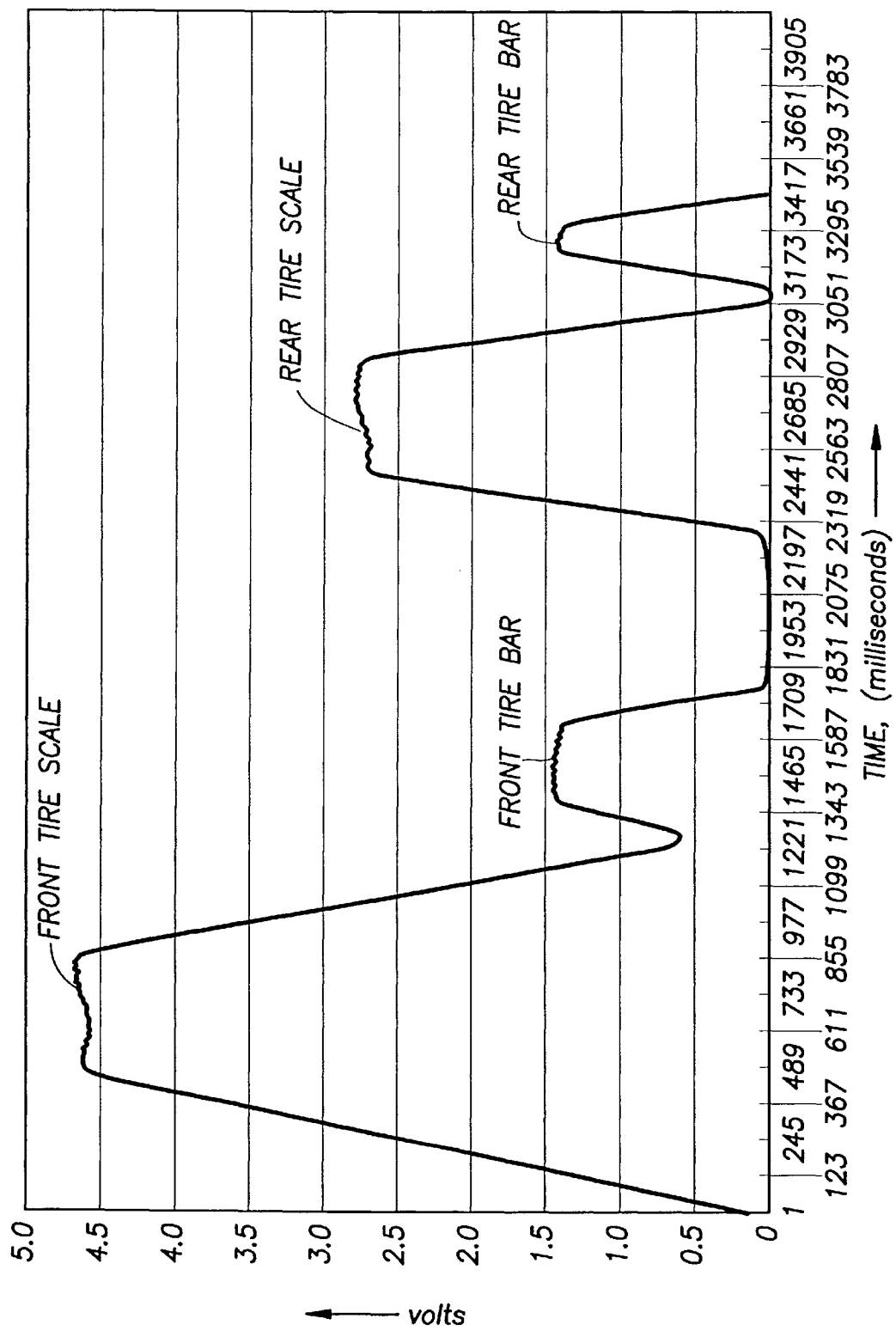
FIG. 9 is a graph of the load cell summer output voltage vs time of a Cadillac with low (15 psig) pressure in the front tire, wherein the signal has only three peaks because the front tire straddles the scale and the bar at the same time.
Figure 10:
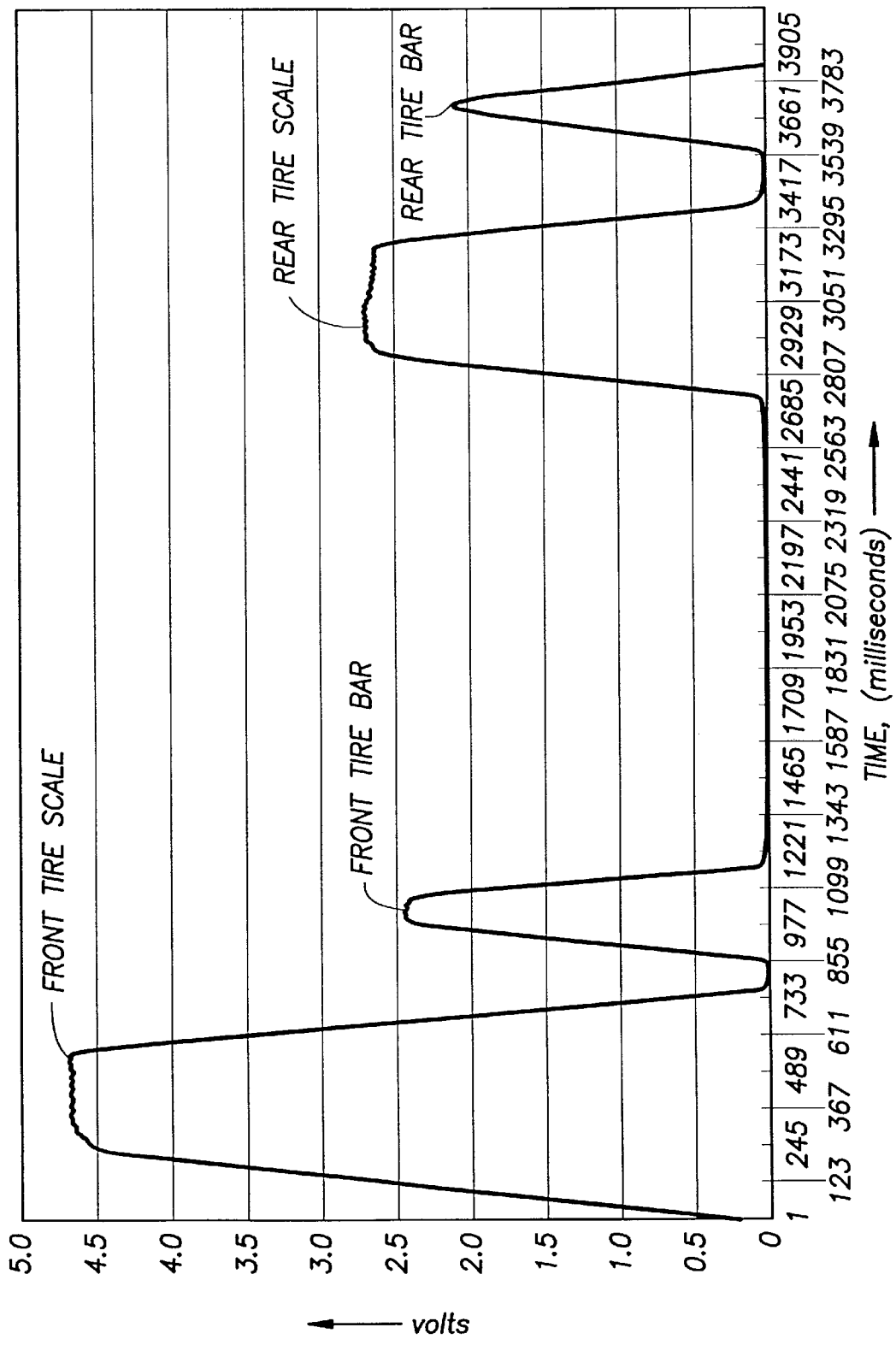
FIG. 10 is a graph, analogous to FIG. 9, of the load cell summer output vs time for a Cadillac with both tires at high pressure (30 psi), wherein the signal has four peaks because the tires are never on the bar and the scale at the same time.

For a properly inflated tire, the signal from the load cell summer 40 from each side of the car consists of four sequential separated peaks: a scale plate 10 peak for the front tire, a deformation bar 20 peak for the front tire, a scale plate 10 peak for the rear tire, and a deformation bar 20 peak for the rear tire. These peaks are shown in FIG. 10. If the tire pressure is low enough, the bottom of the tire broadens out in the direction of travel and does not completely clear the scale plate 10 before reaching the deformation bar 20. In this case, there will be fewer than four peaks. FIG. 9 shows an example for a Cadillac with both tires at 15 psig. The front tire peaks are smeared together so that there are a total of three peaks. If both front and rear tires are low enough, there will be only two smeared peaks and no separated peaks. The scale plate 10 must be of such size as to accommodate the full footprint of the tire.

If the computer 60 detects only two or three peaks, it is assumed that some tires on the car are low. If this is all the information desired, it is not necessary to calculate ratios as subsequently described. Optionally, the computer 60 can tell whether the front or rear tire, or both, has the smeared peaks by comparing the width of the peaks near the bottom. The smeared peaks are much wider than the separated peaks.

Figure 1D:
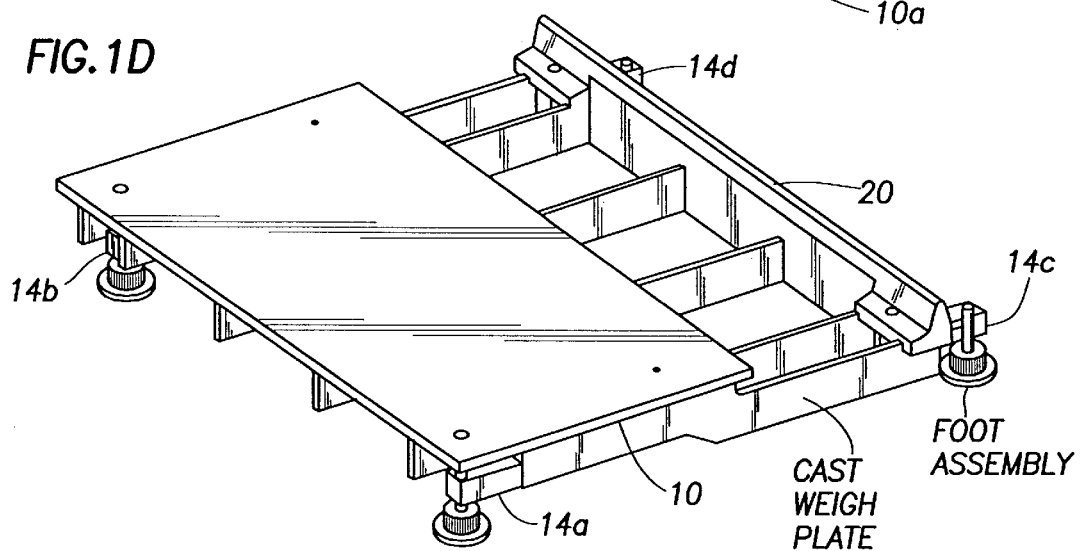
Figure 1C:
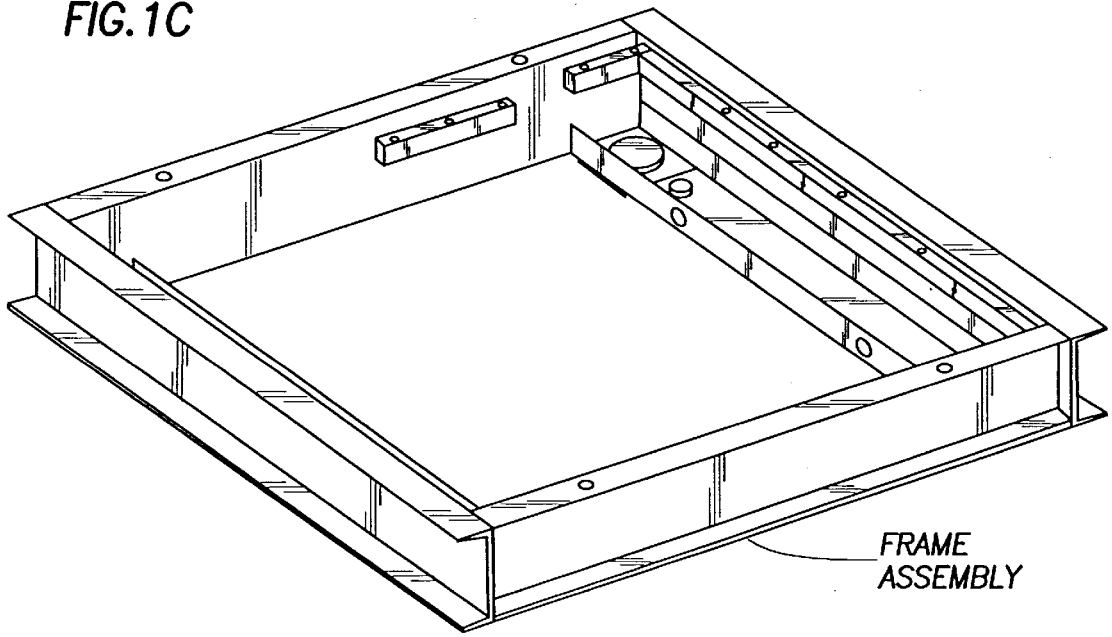
Figure 1F:
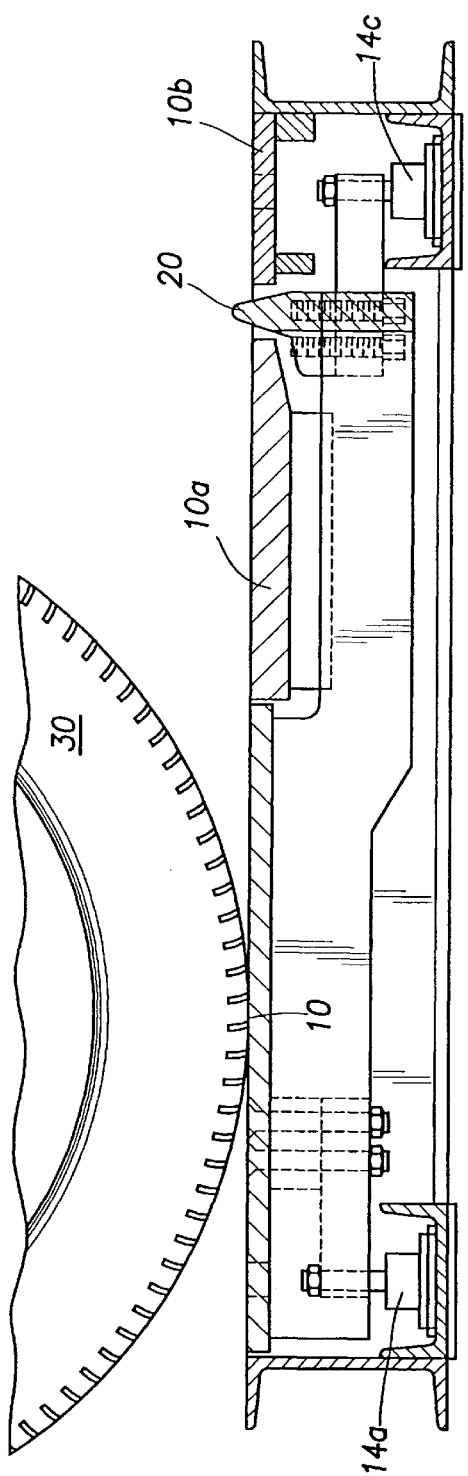
FIG. 1F is a side elevational view of the weight assembly of FIG. 1D with partial cut-aways to show the load cells and feet.

Referring now to FIGS. 1D and 1F, the height of the deformation bar 20 above the road surface might be, for example, ½ inch, preferably 3/16 inch, and the thickness of the deformation bar 20 in the direction of travel might be, for example, ½ inch at its base. The deformation bar 20 may be tapered from its base to a width of 3/16 inch at its top. The deformation bar 20 is longer than the width of the tire so that the entire tread width of the tire 30 rolls over the deformation bar 20.

FIGS. 1B, 1C, 1D, 1E and 1F show various views of the invention. Like elements use the same reference numbers throughout.

The relative degree of underinflation is determined from the above measurements. In particular, in the computer 60, the maximum reading X from the deformation bar 20 is divided by the maximum reading Y from the scale plate 10 to generate "the ratio". This ratio X/Y is, in principle, never greater than one; however, it may vary due to weight shift. When the tire is underinflated, or if the weight on the wheel is sufficiently heavy, some of the weight is taken up by the road surface 12 when the tire is at the top of the deformation bar 20 (as shown in FIG. 2A), thereby reducing weight on the deformation bar 20 below the weight on the scale plate 10, and therefore reducing the ratio X/Y below a value of one. The amount by which the ratio X/Y is reduced for a given pressure depends on both the tire 30 stiffness and the weight on the tire. It has been found that underinflation of a tire can be determined solely from the ratio R and the maximum value Y of the weight on the scale plate 10 with respect to time when the tire is rolling on the scale plate 10 by comparing the ratio with a ratio corresponding to a minimum acceptable inflation pressure for said tire.

This is done by comparing the calculated ratio R (=X/Y) with a predetermined value for the ratio R pertaining to the maximum Y of the first signal. An underinflation signal is given if the calculated ratio is below the predetermined value. In this method it is not required to have prior knowledge of properties of the tire, such as its stiffness, size or type; it is only required to know predetermined values for the ratio R.

Figure 4:
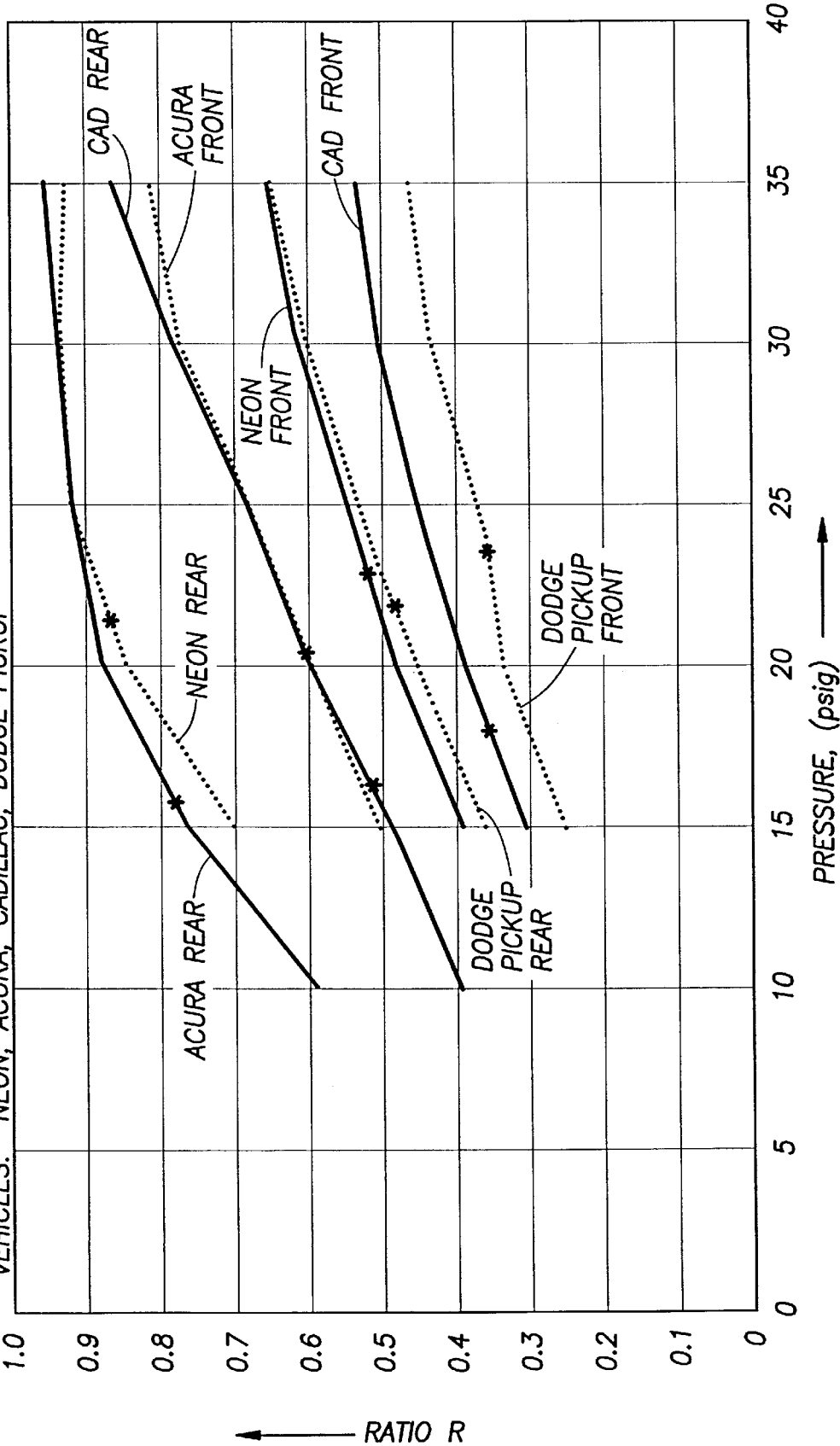
FIG. 4 is a graph of bar: scale weight ratio vs. tire pressure for a wide range of vehicles having a wide range of tire sizes.

Obtaining the predetermined values for the ratio R involves determining, for a large number of combinations of vehicles and tires, the ratio R as a function of tire pressure and calculating for each combination of vehicles and tires a threshold. This will be explained with reference to FIGS. 4 and 5. FIG. 4 shows the ratio as a function of the tire pressure for a wide range of combinations of vehicles and tires installed thereon as curves of the ratio R (=X/Y) as a function of the tire pressure. On each curve a threshold is selected, the threshold being the point on the curve where the ratio R is a predetermined amount below its maximum value, wherein the predetermined amount is at least 5% below the maximum value.

Then a curve of predetermined values for the ratios R (a threshold function) is fitted through a set of points having as coordinates the corresponding maximum value Y of the weight on the scale plate 10 with respect to time when the tire is rolling on the scale plate 10 and the corresponding ratio pertaining to the selected threshold. The asterisks in FIG. 4 are values calculated from the curve of predetermined values.

In order to determine the inflation status of an unknown tire pertaining to an unknown vehicle while the tire is attached to the vehicle, a first signal is recorded which represents the weight on said tire with respect to time when the tire is rolling on a flat surface (in the form of the scale plate 10) and a second signal is recorded which represents the weight on said tire with respect to time when the tire is rolling over a raised object (in the form of the deformation bar 20). Then the maximum Y of the first signal and the maximum X of the second signal are determined, and from these values, the ratio R is calculated by dividing the maximum X of the second signal by the maximum Y of the first signal. The calculated ratio R (=X/Y) is compared with a predetermined value for the ratio R pertaining to the maximum Y of the first signal and giving an underinflation signal if the calculated ratio is below the predetermined value.

Figure 5:
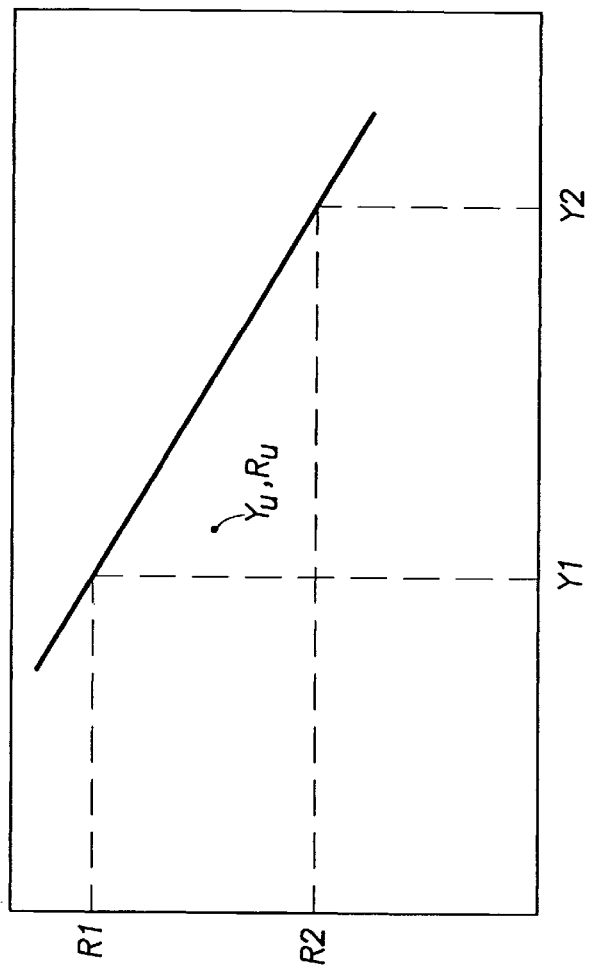
FIG. 5 is a graph, made by using the data from FIG. 4, for determining the weight-dependent threshold for unknown tires.

As a first approximation, the curve of predetermined values for the ratios R can be obtained from only two of these points. In this case, the thresholds pertaining to the highest and lowest curve of FIG. 4 are used; these curves relate to the rear wheel of the Acura and the front wheel of the Dodge, respectively. Reference is now made to FIG. 5 showing in a Y-R diagram a straight line through points (Y1, R1) and (Y2, R2), wherein the point (Y1, R1) represents the rear wheel of the Acura, and wherein (Y2, R2) represents the front wheel of the Dodge.

In FIG. 5 a dot with coordinates Yu and Ru represents an underinflated tire of an unknown vehicle.

The result of this analysis is communicated to the vehicle driver, for example, by an electronically controlled display 50, such as a visual message display, computer speech generator or a printer, connected to the computer 60.

Instead of a straight line, curves of a more general shape may be used to fit a threshold function to a more extensive set of data. For example, in FIG. 4, the "asterisk" on each curve denotes a calculated threshold value using a quadratic threshold function that was fitted to threshold ratios selected for each of the curves shown in FIG. 4.

The preferred method for generating a threshold function is as follows:

Target threshold ratios are calculated for each test vehicle tire. A target threshold ratio is the lesser of 85 percent of the maximum ratio for that tire, as determined from experimental data; or the ratio corresponding to 25 psi for that tire, as determined by experimental data.

Figure 11:
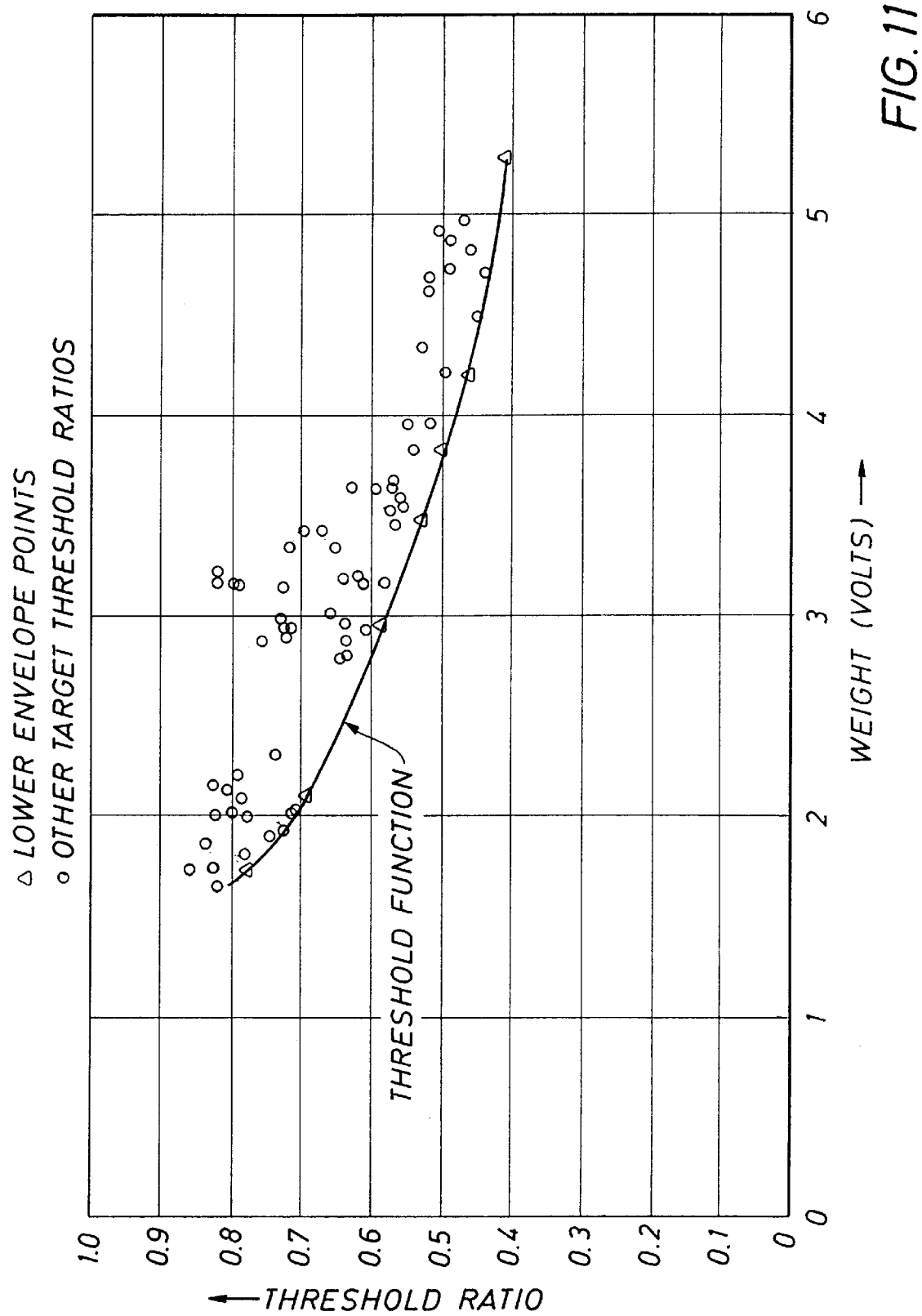
FIG. 11 is a preferred method of generating a threshold function.

All the target threshold values are plotted vs weight on the tire as shown in FIG. 11.

From this data, pick the points that define a lower envelope for the curve: that is, points that have the lowest ratio values for all the points of approximately the same weight.

A smooth threshold function is fitted to the lower envelope points using regression. The threshold function has a ratio value as high as possible for each weight but does not exceed the ratio value for any target threshold ratio at its corresponding weight. The preferred form of the threshold ratio function is $$\text{Threshold ratio} = ay + b/y + c/y^2 + d/y^2$$

where y is the weight on the tire, measured in volts output from the load cell summer, and a, b, c, and d are coefficients to be determined from a regression.

FIG. 11 shows a graph of an example of target threshold ratios with the corresponding threshold function being shown. Data was taken from the following vehicles: Dodge Neon, Toyota Corolla, Cadillac Sedan Deville, Dodge pickup truck, GMC pickup truck, Dodge Caravan, Acura Integra, Ford Explorer, Nissan Altima, and Ford Escort.

It will be appreciated that data other than the ratio R (=X/Y) or bar/scale can be used. For example, curves analogous to FIG. 4 may be generated using only data corresponding to the weight on the deformation bar 20 and using a single-valued threshold independent of weight which is a horizontal line just below the maximum of the lower most curve. This data is presented in FIG. 6. A curve (not shown) analogous to FIG. 5 may be generated in the same manner using the threshold points of the high and low curves of FIG. 6.

Figure 7:
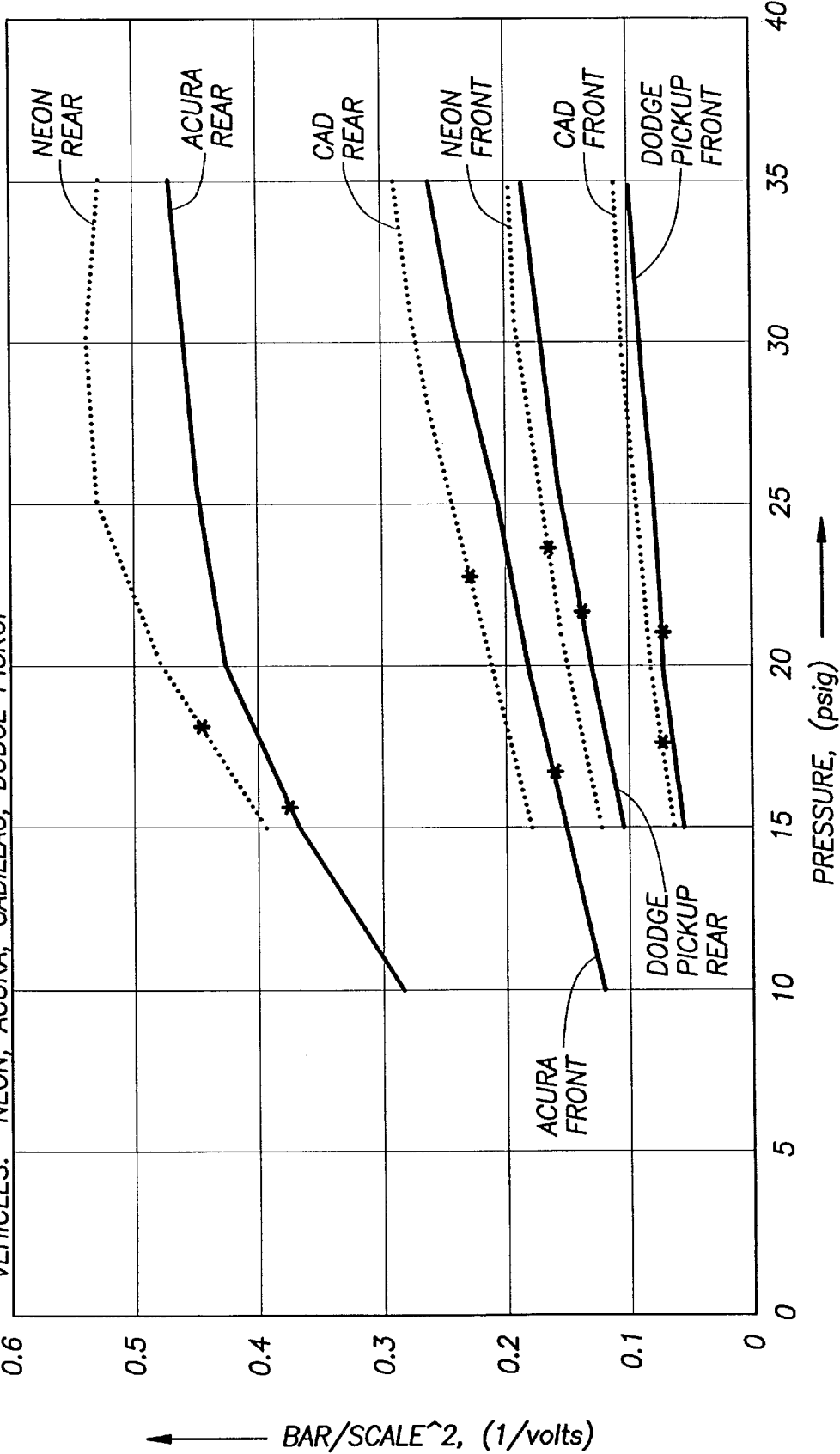
FIG. 7 is a graph, analogous to FIG. 4, of the bar/scale$^2$ reading vs tire pressure for data used in obtaining FIG. 4, with a weight-dependent threshold shown.

Alternatively, the ratio, bar/scale, may be generalized to bar/f (scale), where f (scale) is a generalized function of scale weight, for example, a polynomial in scale weight. The preferred implementation is $bar/scale^2$. A threshold for this ratio is determined and applied using the same method as described for the bar/scale ratio. It has been found that $bar/scale^2$ allows a wider margin between the threshold and the maximum value of the ratio (typically at 35 psi) than does bar/scale, without increasing the minimum and maximum threshold pressures. FIG. 7 shows a graph of $bar/scale^2$ vs pressure including a threshold function.

Figure 8:
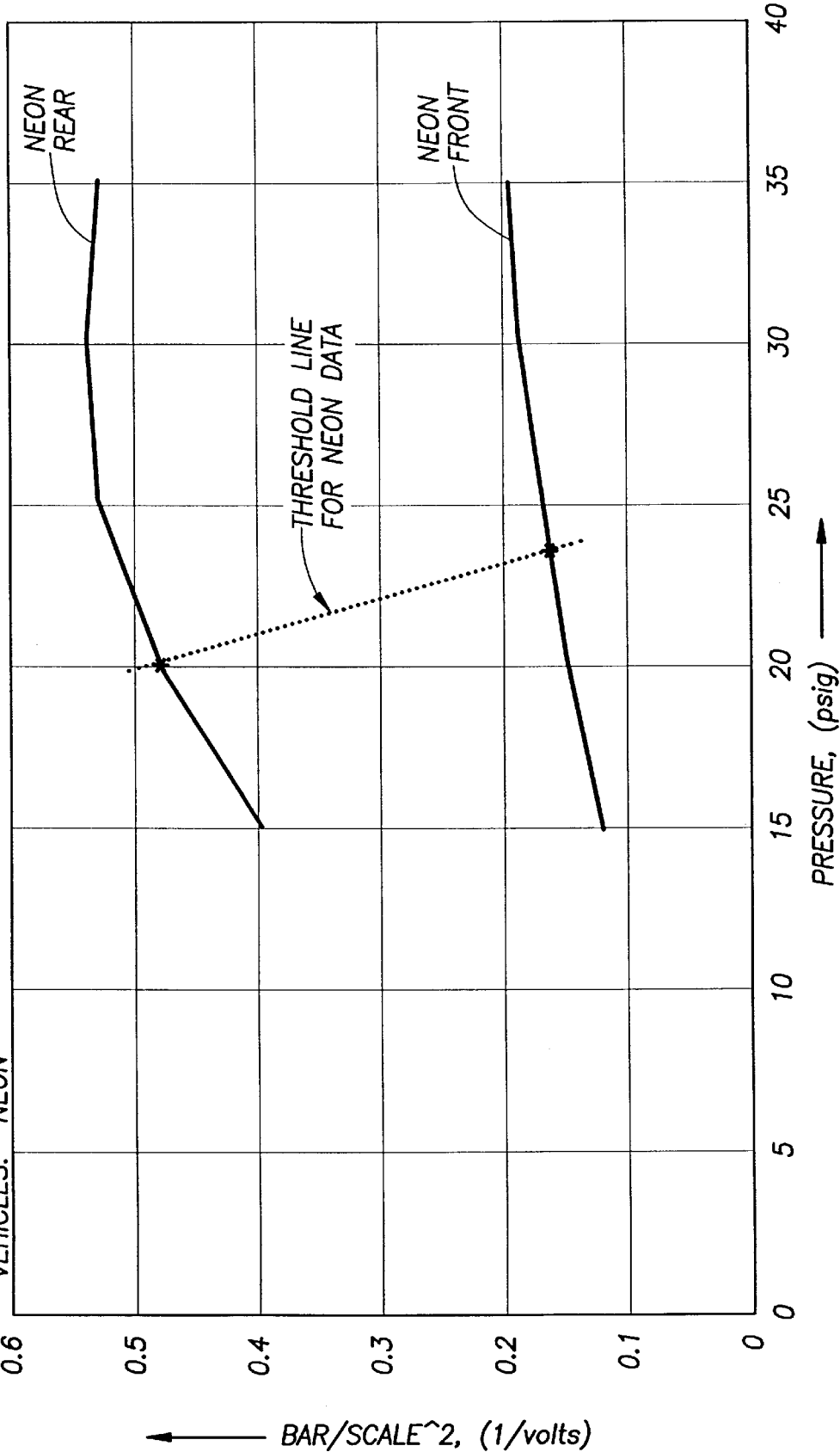
FIG. 8 is a graph, analogous to FIG. 4, of the bar/scale$^2$ reading vs tire pressure for data used in obtaining FIG. 4, with a weight-dependent threshold derived for one type of tire only.

If the type of tire is known to the tire checker, a tire inflation status calculation can be performed for that specific type of tire. An example is shown in FIG. 8, where the threshold has been determined for only one type of tire and set to fall between 20 and 25 psig. Communication of the tire type to the tire checker may be, for example, by manual or speech input, automatically by a wireless transponder in the vehicle, or by an automatic image scanner that reads the tire type directly off the tire. If the tire type is known, the threshold of detection can be set over a smaller range of pressure than if all possible types of tires have to be accommodated.

It will be appreciated that there are many other methods for setting thresholds and calculating tire inflation status from the data collected, which may include the time duration of the top or bottom (say at the 10 percent and 90 percent of peak levels) of each of the four peaks, or other time-related parameters. These methods are generally known as statistical classification methods.

Figure 3:
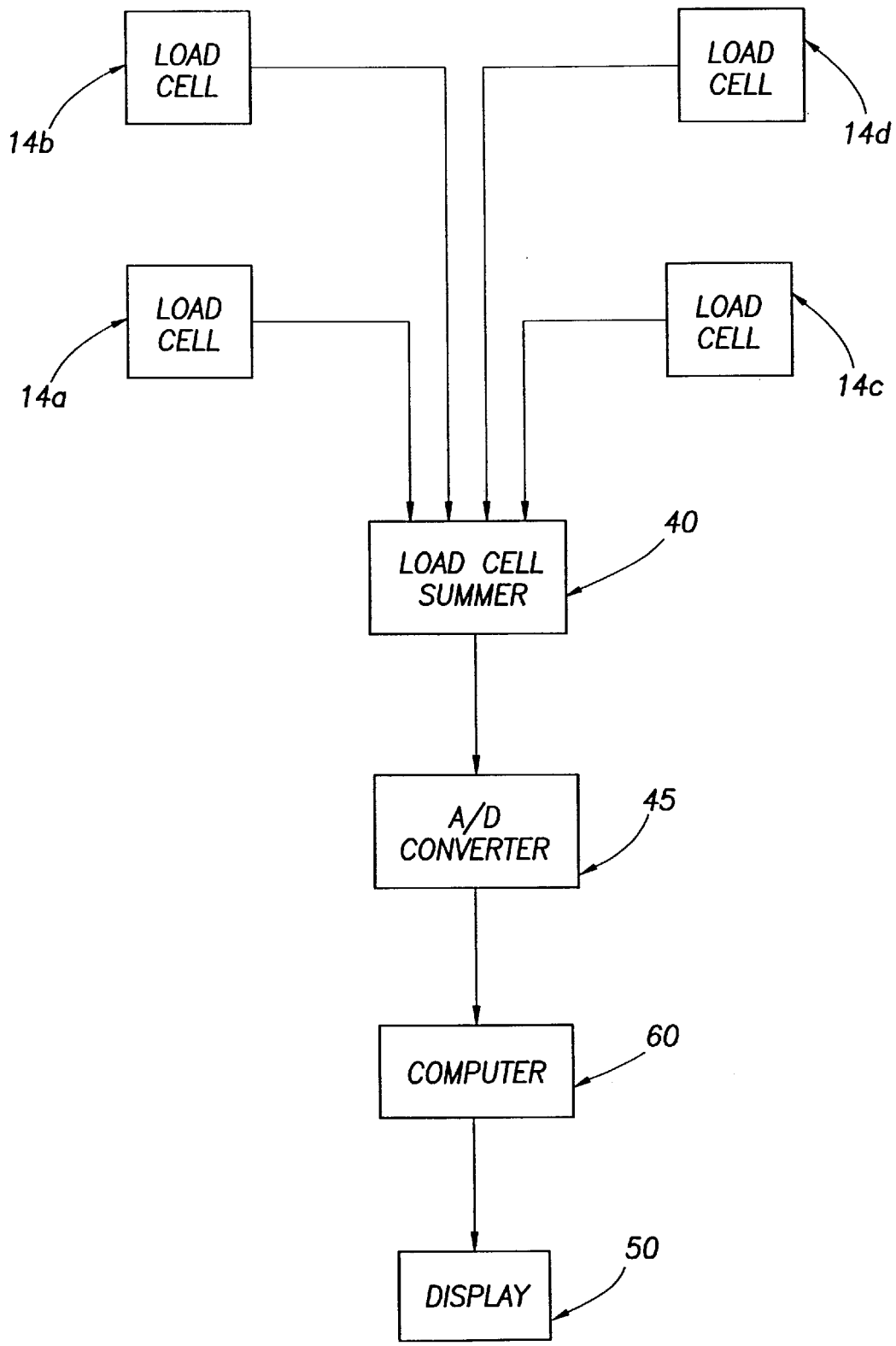
FIG. 3 is a block diagram of the data generating, converting and gathering components required by the invention.

FIG. 3 shows the components used for data acquisition, calculation, and output of results. The load cells 14a–14d produce raw voltage signals. The load cell summer 40 adds together the voltages from the four load cells for each measurement, amplifies the signals from the millivolt range to the volt range and inputs these signals to the computer 60 via A/D converter 45.

The computer 60 receives the load cell summer 40 output via A/D converter 45 which converts the analog voltages from summer 40 to digital outputs for use by the computer and stores it for analysis. The A/D converter 45 may be integral with the computer 60 or may be a separate unit. The computer 60 then determines the peak scale (Y) and bar (X) readings for both the front and rear tires. It then calculates the ratio X/Y, determines the weight-dependent threshold, and determines whether the tire is underinflated. It then communicates the result to the desired output device(s) 50.

FIG. 4 is a graph of the bar: scale (X/Y) weight ratio vs. actual psi (tire pressure) for a group of four vehicles with varying tire sizes. The vehicles and tire sizes are as shown in Table 1 (the vehicles are shown in the order of increasing weight from top to bottom):

TABLE 1

| Vehicle | Tire Size |
| --- | --- |
| Neon | P185/65 R14 |
| Acura | P195/55 R15 |
| Cadillac | P225/60 R16 |
| Dodge Pickup | P225/75 R15 |

The weight-dependent threshold for each set of measurements is denoted by an "*" sign on the curves of FIG. 4. Readings to the left of the "*" signs (i.e., a lower bar:scale ratio) indicate an underinflated tire.

The data used to generate the curves shown herein were collected using a Compaq 486/33 computer using National Instruments LabVIEW software. A Z-World Micro-G2C computer programmed using dynamic C language has also been used to collect data and calculate ratios to compare ratios to thresholds, and will be used in commercial embodiments. An amplifier and summing board, Part No. API 4058G4-SUM012, supplied by Absolute Process Instruments, was used with a data acquisition board supplied by National Instruments, Model AT-MIO-16E-10. The load cells used were Rice Lake Weighing Model No. 300000, Part No. 21491 supported by foot assembly shock mounts, Part No. EF2.500, supplied by B-Tek.

The invention has been described herein by having a tire 30 first roll over a scale plate 10, then a deformation bar 20. This sequence could be reversed without detracting from the invention.

I claim:

1. A method for determining the inflation status of a vehicle tire while said tire is installed on said vehicle, comprising the steps of:

recording a first signal representing the weight (Y) on a scale plate with respect to time when said tire is rolling on said scale plate;

recording a second signal representing the weight (X) on a deformation bar with respect to time when said tire is rolling over said deformation bar;

determining the maximum Y of said first signal and the maximum X of said second signal;

calculating a ratio R by dividing the maximum X of said second signal by the maximum Y of said first signal; and comparing said calculated ratio R (=X/Y) with a predetermined value for the ratio R pertaining to said maximum Y of said first signal and giving an underinflation signal if said calculated ratio is below said predetermined value.

2. The method according to claim 1, wherein the method for obtaining said predetermined value for said ratio comprises the steps of determining for a large number of combinations of vehicles and tires said ratio R as a function of tire pressure;

calculating for each combination of vehicles and tires a threshold; and fitting a curve of predetermined values for said ratios R through points having as coordinates the corresponding maximum value Y of the weight on said scale plate with respect to time when said tire is rolling on said scale plate, and the corresponding ratio pertaining to said threshold.

3. The method according to claim 2 wherein said curve of predetermined values is fitted so as to define a smooth curve that is an envelope which lies below all threshold data.

4. The method according to claim 3 wherein said envelope lies as close to said data as possible.

* * * * *